United States Patent
Kim et al.

(10) Patent No.: US 12,080,878 B2
(45) Date of Patent: Sep. 3, 2024

(54) ANODE LAYER FOR ALL-SOLID SECONDARY BATTERY, ALL-SOLID SECONDARY BATTERY INCLUDING THE SAME, AND METHOD OF MANUFACTURING ALL-SOLID SECONDARY BATTERY

(71) Applicant: SAMSUNG SDI CO., LTD., Yongin-si (KR)

(72) Inventors: Jinkyu Kim, Yongin-si (KR); Jinhoon Yang, Yongin-si (KR); Yunchae Jung, Yongin-si (KR); Byeonggyu Cho, Yongin-si (KR); Sangil Han, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 149 days.

(21) Appl. No.: 17/500,076

(22) Filed: Oct. 13, 2021

(65) Prior Publication Data
US 2022/0223837 A1 Jul. 14, 2022

(30) Foreign Application Priority Data
Oct. 15, 2020 (KR) .......................... 10-2020-0133741

(51) Int. Cl.
| | | |
|---|---|---|
| *H01M 4/36* | (2006.01) | |
| *H01M 4/02* | (2006.01) | |
| *H01M 4/04* | (2006.01) | |
| *H01M 4/133* | (2010.01) | |
| *H01M 4/134* | (2010.01) | |

(Continued)

(52) U.S. Cl.
CPC ......... *H01M 4/364* (2013.01); *H01M 4/0404* (2013.01); *H01M 4/133* (2013.01); *H01M 4/134* (2013.01); *H01M 10/0562* (2013.01); *H01M 10/058* (2013.01); *H01M 2004/021* (2013.01);

(Continued)

(58) Field of Classification Search
CPC .... H01M 4/364; H01M 4/0404; H01M 4/133; H01M 4/134; H01M 10/0562; H01M 10/058; H01M 2004/021; H01M 2004/027; H01M 4/362; H01M 4/38; H01M 4/386;

(Continued)

(56) References Cited

U.S. PATENT DOCUMENTS

| | | | |
|---|---|---|---|
| 10,756,383 B2 | 8/2020 | Takahashi et al. | |
| 2016/0064731 A1* | 3/2016 | Jung ....................... | H01M 4/62 252/182.1 |

(Continued)

FOREIGN PATENT DOCUMENTS

| | | |
|---|---|---|
| CN | 109148873 A | 1/2019 |
| CN | 109244527 A | 1/2019 |

(Continued)

OTHER PUBLICATIONS

Extended European Search Report dated Mar. 11, 2022.

*Primary Examiner* — Stewart A Fraser
(74) *Attorney, Agent, or Firm* — Lee IP Law, P.C.

(57) ABSTRACT

An anode layer for all-solid secondary batteries, an all-solid secondary battery, and a method of manufacturing an all-solid secondary battery, the anode layer including an anode current collector; and a first anode active material layer on the anode current collector, wherein the first anode active material layer includes a metal-carbon composite including a metal, carbon, and a polyol.

20 Claims, 6 Drawing Sheets

(51) Int. Cl.
*H01M 10/0562* (2010.01)
*H01M 10/058* (2010.01)

(52) U.S. Cl.
CPC ............... *H01M 2004/027* (2013.01); *H01M 2300/008* (2013.01)

(58) Field of Classification Search
CPC ...... H01M 4/387; H01M 4/583; H01M 4/622; H01M 10/0525; H01M 4/587; H01M 4/62
See application file for complete search history.

(56) References Cited

U.S. PATENT DOCUMENTS

| | | | |
|---|---|---|---|
| 2018/0069235 A1 | 3/2018 | Lee et al. | |
| 2018/0183084 A1 | 6/2018 | Min et al. | |
| 2019/0051904 A1* | 2/2019 | Zhamu | H01M 10/058 |
| 2019/0088932 A1 | 3/2019 | Yazami et al. | |
| 2019/0221886 A1* | 7/2019 | Yakovleva | C22C 1/0408 |
| 2020/0136178 A1 | 4/2020 | Ku et al. | |
| 2020/0144599 A1 | 5/2020 | Lee et al. | |
| 2020/0223704 A1* | 7/2020 | Neale | H01M 10/0525 |
| 2020/0313229 A1* | 10/2020 | Haga | H01M 10/0525 |
| 2021/0005927 A1* | 1/2021 | Hoffert | H01M 10/0585 |
| 2021/0210791 A1 | 7/2021 | Suzuki et al. | |
| 2022/0069310 A1 | 3/2022 | Min et al. | |
| 2022/0123369 A1 | 4/2022 | Choi et al. | |

FOREIGN PATENT DOCUMENTS

| | | |
|---|---|---|
| JP | 2007-123192 A | 5/2007 |
| JP | 2018-518817 A | 7/2018 |
| JP | 6497282 B2 | 3/2019 |
| JP | 2019-160407 A | 9/2019 |
| KR | 10-2018-0027022 A | 3/2018 |
| KR | 10-2018-0076954 A | 7/2018 |
| KR | 10-2019-0129768 A | 11/2019 |
| KR | 10-2020-0052707 A | 5/2020 |
| KR | 10-2020-0078479 A | 7/2020 |
| KR | 10-2022-0028933 A | 3/2022 |
| KR | 10-2022-0052032 A | 4/2022 |
| WO | WO 2016-167591 A | 10/2016 |
| WO | WO 2017-030127 A1 | 2/2017 |

* cited by examiner

ANODE LAYER FOR ALL-SOLID SECONDARY BATTERY, ALL-SOLID SECONDARY BATTERY INCLUDING THE SAME, AND METHOD OF MANUFACTURING ALL-SOLID SECONDARY BATTERY

CROSS-REFERENCE TO RELATED APPLICATION

This application is based on and claims priority under 35 U.S.C. § 119 to Korean Patent Application No. 10-2020-0133741, filed on Oct. 15, 2020, in the Korean Intellectual Property Office, the disclosure of which is incorporated by reference herein in its entirety.

1. FIELD

Embodiments relate to an anode layer for all-solid secondary batteries, an all-solid secondary battery including the same, and a method of manufacturing the all-solid secondary battery.

2. DESCRIPTION OF THE RELATED ART

Recently, in response to industrial demands, batteries having high energy density and safety have been actively developed. For example, lithium-ion batteries may be used not only in the fields of information-related appliances and communication appliances, but also in the fields of automobiles. In the fields of automobiles, safety is especially important because it has an influence on life.

SUMMARY

The embodiments may be realized by providing an anode layer for all-solid secondary batteries, the anode layer including an anode current collector; and a first anode active material layer on the anode current collector, wherein the first anode active material layer includes a metal-carbon composite including a metal, carbon, and a polyol.

In the metal-carbon composite, the metal may include silver, zinc, silicon, tin, or a combination thereof.

The metal-carbon composite may have a bulk density of about 0.1 g/cm$^3$ to about 0.5 g/cm$^3$, and a BET specific surface area of about 40 m$^2$/g to 60 m$^2$/g.

In an infrared spectroscopic analysis of the metal-carbon composite, one absorption peak appears at a wave number of about 750 cm$^{-1}$ to about 1,200 cm$^{-1}$, and another absorption peak appears at a wave number of about 3,250 cm$^{-1}$ to about 3,500 cm$^{-1}$.

In a thermogravimetric analysis of the metal-carbon composite, a weight loss may be about 3 wt % to about 30 wt % at about 50° C. to about 150° C.

The anode layer may have a porosity of 30% or less.

The polyol may include ethylene glycol, diethylene glycol, triethylene glycol, tetraethylene glycol, poly(ethylene glycol), propanediol, butanediol, pentanediol, hexanediol, glycerol, or a combination thereof.

In the metal-carbon composite, a content of the metal may be about 3 wt % to about 25 wt %, a content of the carbon may be about 55 wt % to about 95 wt %, and a content of the polyol may be about 2 wt % to about 40 wt %, based on a total weight of the metal-carbon composite.

The anode layer may further include a metal or metalloid thin film between the anode current collector and the first anode active material layer.

The metal or metalloid thin film may include gold (Au), silver (Ag), magnesium (Mg), zinc (Zn), silicon (Si), tin (Sn), platinum (Pt), palladium (Pd), aluminum (Al), bismuth (Bi), or a combination thereof, and the metal or metalloid thin film may have a thickness of about 1 nm to about 800 nm.

The anode layer may further include a second anode active material layer, wherein the second anode active material layer includes a metal, a metalloid element, or a combination thereof, the metal or metalloid element being capable of forming an alloy with lithium, or the second anode active material layer is a metal layer including lithium or a lithium alloy.

The embodiments may be realized by providing an all-solid secondary battery including a cathode layer; an anode layer; and a solid electrolyte layer between the cathode layer and the anode layer, wherein the anode layer is the anode layer according to an embodiment.

The anode layer may further include a second anode active material on the first anode active material layer or between the anode current collector and the first anode active material layer, and the second anode active material layer may include lithium or a lithium alloy.

The anode layer may further include a carbon layer between the first anode active material layer and the solid electrolyte layer.

A solid electrolyte included in the solid electrolyte layer may be a sulfide solid electrolyte.

The sulfide solid electrolyte may include Li$_2$S—P$_2$S$_5$, Li$_2$S—P$_2$S$_5$—LiX, in which X is a halogen element, Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$, in which m and n are each a positive number, and Z is Ge, Zn, or Ga, Li$_2$S—GeS$_2$, Li$_2$S—SiS$_2$—Li$_3$PO$_4$, Li$_2$S—SiS$_2$—Li$_p$MO$_q$, in which p and q are each a positive number, and M is P, Si, Ge, B, Al, Ga, or In, Li$_{7-x}$PS$_{6-x}$Cl$_x$, in which 0≤x≤2, Li$_{7-x}$PS$_{6-x}$Br$_x$, in which 0≤x≤2, or Li$_{7-x}$PS$_{6-x}$I$_x$, in which 0≤x≤2.

The sulfide solid electrolyte may be an argyrodite solid electrolyte including Li$_6$PS$_5$Cl, Li$_6$PS$_5$Br, or Li$_6$PS$_5$I.

The embodiments may be realized by providing a method of manufacturing an all-solid secondary battery, the method including providing an anode layer including an anode current collector and a first anode active material layer; providing a cathode layer; providing a solid electrolyte layer between the anode layer and the cathode layer to prepare a laminate; and pressing the laminate, wherein the first anode active material layer includes a metal-carbon composite including a metal, carbon, and a polyol.

Providing the anode layer may include applying a composition including the metal-carbon composite, a binder, and a solvent onto an anode current collector and drying to prepare the anode layer including the first anode active material layer including the anode current collector and a metal-carbon composite.

The metal-carbon composite may be prepared by mixing a carbon material, a metal precursor, a polyol, and a solvent to obtain a mixture; and applying light or heat to the mixture.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
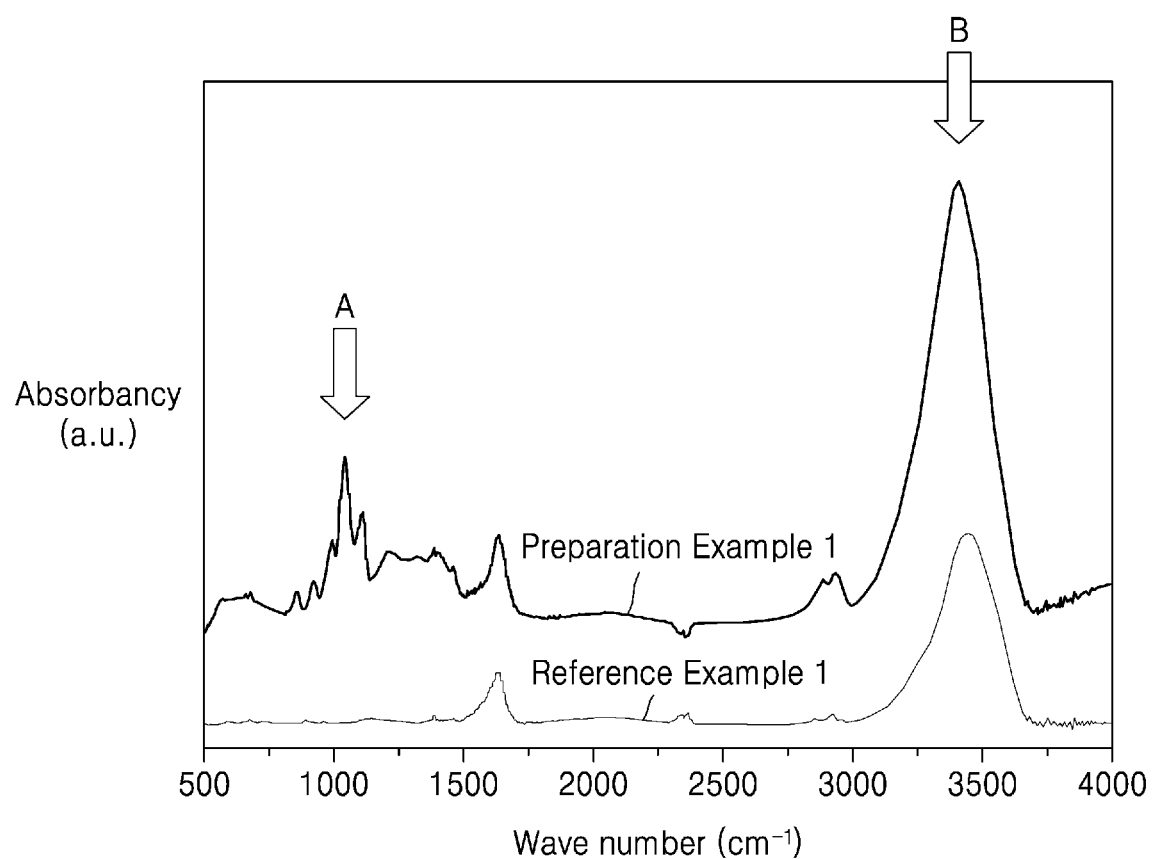
FIG. 1 is an infrared spectrum of a silver-carbon composite prepared according to Preparation Example 1 and a first carbon black used in preparation of the silver-carbon composite.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout. As used herein, the terms "or" and "and/or" are not exclusive terms, and include any and all combinations of one or more of the associated listed items, e.g., "A or B" would include A, B, or A and B. Expressions such as "at least one of," when preceding a list of elements, modify the entire list of elements and do not modify the individual elements of the list.

Hereinafter, an anode layer for all-solid secondary batteries, an all-solid secondary battery including the same, and a method of manufacturing an all-solid secondary battery according to embodiments will be described in more detail.

In an all-solid secondary battery having an anode layer using a carbon material and a metal as an anode active material, lithium transferred from a cathode may be uniformly deposited in the anode layer so that dendrites may not grow toward a solid electrolyte layer and a cathode active material layer. In order to address such an issue, an all-solid secondary battery in which a lithium storage layer is between an anode current collector and a solid electrolyte layer has been considered.

However, in such an all-solid secondary battery, metal lithium deposited at the interface between the solid electrolyte layer and the anode current collector could grow dendrites through the pores of the solid electrolyte layer toward the cathode active material layer, resulting in frequent short circuits.

The carbon material may be a hydrophobic material, and when the anode layer is prepared using a hydrophobic carbon material and an aqueous binder, the dispersibility of a composition of the anode active material layer may be deteriorated, such that the bonding strength of the anode layer formed from the composition may not reach a satisfactory level.

Accordingly, one or more embodiments may provide an anode layer for an all-solid secondary battery structure and an all-solid secondary battery having the same.

An anode layer for all-solid secondary batteries may include, e.g., an anode current collector; and a first anode active material layer on the anode current collector. The first anode active material layer may include a metal-carbon composite including a metal, carbon, and a polyol.

In the metal-carbon composite, the carbon material may serve as a carrier, and the metal-carbon composite may have a structure in which a metal is supported on the carbon material. Further, the polyol may be on the surface of the carbon material (having hydrophobicity) to surface-modify the carbon material to thus have hydrophilicity and to have high bonding strength between the metal and the carbon material. As a result, when an anode active material layer is formed using such a metal-carbon composite, dispersibility and miscibility of a composition for the anode active material layer may be improved in an aqueous system using an aqueous binder. Further, due to the high bonding strength between the metal and carbon, even if charge/discharge cycles continue, the volume expansion of the metal-carbon composite may be effectively suppressed, the occurrence of short circuits due to dendrites may be reduced, and lifespan and high-rate characteristics of the battery may be improved.

Examples of the carbon material may include carbon black, graphite, ketjen black (KB), vapor-grown carbon fiber (VGCF), acetylene black (AB), activated furnace black, carbon nanotubes (CNT), graphene, and combinations thereof.

In the metal-carbon composite included in the anode active material layer, a content of the metal may be, e.g., about 3 wt % to about 25 wt %, a content of the carbon material may be, e.g., about 55 wt % to about 95 wt %, and a content of the polyol may be, e.g., about 2 wt % to about 40 wt % (all wt % being based on a total weight of the metal-carbon composite). In an implementation, in the metal-carbon composite included in the anode active material layer, the content of the metal may be, e.g., about 4 wt % to about 25 wt %, about 5 wt % to about 25 wt %, or about 5 wt % to about 15 wt %, the content of the carbon material may be, e.g., about 65 wt % to about 95 wt %, about 70 wt % to about 92 wt %, about 75 wt % to about 90 wt %, or about 80 wt % to about 90 wt %. and the content of the polyol may be, e.g., about 3 wt % to about 35 wt %, about 4 wt % to about 35 wt %, about 5 wt % to about 30 wt %, or about 5 wt % to about 15 wt %.

When the content of the polyol is within the above range, the anode layer may have a low porosity and excellent bonding strength. Here, carbon is a term corresponding to a carbon material.

The polyol may be, e.g., an aliphatic compound having two or more hydroxyl groups, and may have a molecular weight of, e.g., about 10,000 g/mol to about 1,000,000 g/mol, about 3,000 g/mol to about 10,000 g/mol, or 6000 g/mol. In an implementation, the polyol may include, e.g., ethylene glycol, propylene glycol, glycerol, diethylene glycol, triethylene glycol, tetraethylene glycol, poly(ethylene glycol) having a molecular weight of less than 5,000, propanediol, butanediol, pentanediol, hexanediol, or glycerol. Here, the term "molecular weight" refers to a weight average molecular weight.

In an implementation, the metal-carbon composite may further include a solid electrolyte. The solid electrolyte may include, e.g., a sulfide solid electrolyte, an oxide solid electrolyte, or a combination thereof.

[All-Solid Secondary Battery]

An all-solid secondary battery according to an embodiment may include, e.g., a cathode layer; an anode layer; and a solid electrolyte layer between the cathode layer and the anode layer and including a solid electrolyte. The cathode layer may include, e.g., a cathode current collector and a cathode active material layer on the cathode current collector. The anode layer may include, e.g., an anode current collector and a first anode active material layer on the anode current collector. The first anode active material layer may include, e.g., a metal-carbon composite including a metal, a carbon material, and a polyol.

An adhesive force of the anode layer to the solid electrolyte layer may be, e.g., about 80 gf/mm to about 150 gf/mm.

Figure 3:
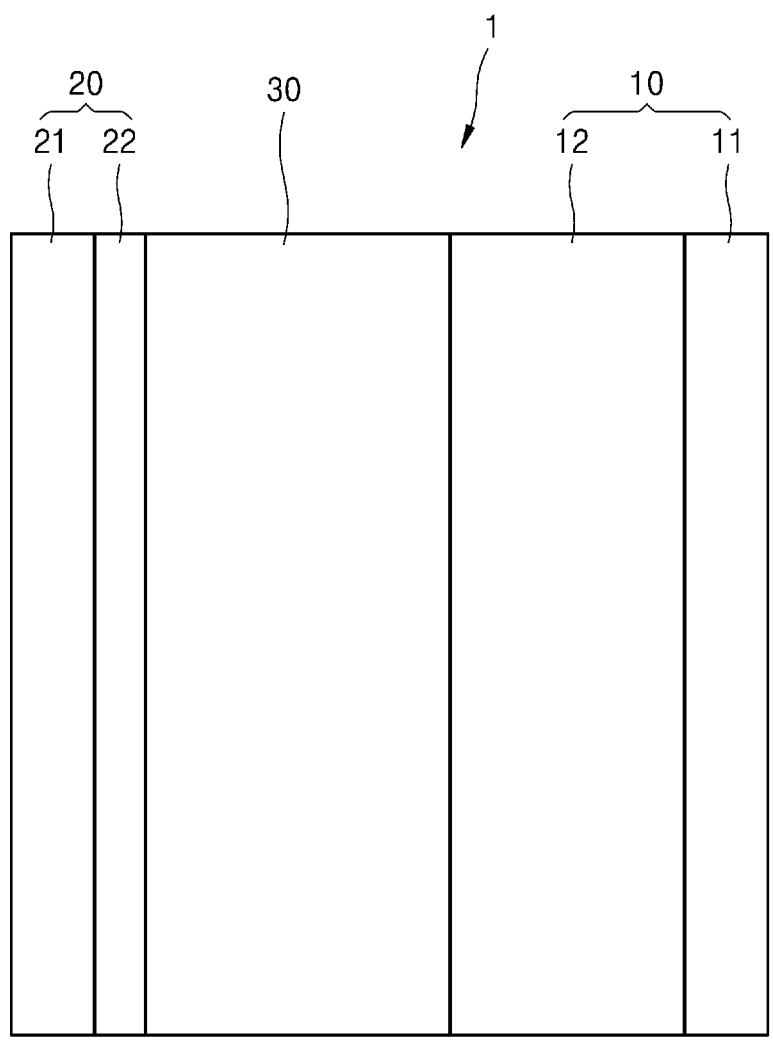
FIGS. 3 to 5 are cross-sectional views of an all-solid secondary battery according to an embodiment.

Referring to FIG. 3, an all-solid secondary battery 1 may include, e.g., a cathode layer 10; an anode layer 20; and a solid electrolyte layer 30 (including a solid electrolyte) between the cathode layer 10 and the anode layer 20.

The first anode active material layer may have a thickness of about 1 µm to about 20 µm, e.g., about 1 µm to about 10 µm, about 2 µm to about 8 µm, or about 4 µm to about 6 µm.

A metal or metalloid thin film may be further included between the anode current collector and the first anode active material layer. The metal or metalloid thin film may include, e.g., gold (Au), silver (Ag), magnesium (Mg), zinc (Zn), silicon (Si), tin (Sn), platinum (Pt), palladium (Pd), aluminum (Al), bismuth (Bi), or a combination thereof. The metal or metalloid thin film may have a thickness of about 1 nm to about 800 nm, e.g., about 10 nm to about 30 nm.

The first anode active material layer may have a porous structure. The first anode active material layer may have a porosity of 30% or less, e.g., about 5% to about 25%.

When the porosity of the first anode active material layer is within the above range, it is possible to effectively suppress the growth of dendrites up to the cathode active material layer, thereby suppressing the occurrence of short circuits due to dendrites, and thus it is possible to manufacture an all-solid secondary battery having high voltage, high capacity, and excellent lifespan characteristics.

At the interface between the solid electrolyte layer and the anode current collector, metal (e.g., non-compounded) lithium may be deposited as a deposition point of metal lithium. The deposited lithium could cause a short circuit in the all-solid secondary battery if dendrites were to grow toward the cathode active material layer through the pores of the solid electrolyte layer.

However, when the porosity of the first anode active material layer is within the above range, it is possible to effectively suppress the growth of dendrites up to the cathode active material layer, thereby suppressing the occurrence of short circuits due to dendrites, and thus it is possible to manufacture an all-solid secondary battery having high voltage, high capacity, and excellent lifespan characteristics.

In the present specification, the porosity may be confirmed or observed through a mercury porosity measurement method or a scanning electron microscope (SEM). In the method of measuring the porosity using a mercury porosity meter, the pore size and pore distribution are calculated by measuring the amount of mercury introduced while introducing mercury into the sample.

In an implementation, the anode layer according to an embodiment may further include, e.g., a second anode active material layer. The second anode active material layer may be on the first anode active material layer or between the anode current collector and the first anode active material layer. The second anode active material layer may include a metal, a metalloid element, or a combination thereof, which is capable of forming an alloy with lithium. The second anode active material layer may include, e.g., a metal layer including lithium or a lithium alloy. In an implementation, the surface of the second anode active material layer may include lithium fluoride (LiF).

The second anode active material layer may be a lithium-free region that does not include lithium metal or a lithium alloy in the initial state of the all-solid secondary battery or after the discharging of the all-solid secondary battery. Before charging, the anode layer may have a structure including an anode current collector, metal or metalloid film, and a first anode active material layer. After the anode layer is charged, a second anode active material layer may be formed on the first anode active material layer. The second anode active material layer may be non-porous.

In an implementation, a carbon layer may be further included between the first anode active material layer and the solid electrolyte layer. The carbon layer may be formed using, e.g., carbon black, carbon fiber, graphite, carbon nanotubes, graphene, or a combination thereof. When the carbon layer is formed in this way, the resistance between the first anode active material layer and the solid electrolyte layer may be lowered, and lithium dendrites may be suppressed. Accordingly, the all-solid secondary battery having an anode layer in which a carbon layer is further formed may have improved lifespan characteristics compared to an all-solid secondary battery having an anode layer in which a carbon layer is not formed.

A method of preparing a metal-carbon composite according to an embodiment will be described.

First, a carbon material, a metal precursor, and a polyol may be mixed to obtain a mixture, and a heat treatment process of the mixture may be performed. The contents of the carbon material, the metal precursor and the polyol in the mixture may be stoichiometrically controlled to obtain a desired metal-carbon composite.

A dispersant may be added to the mixture. Here, the dispersant may serve as a stabilizer to uniformly disperse and maintain the carbon material in a solvent.

In an implementation, the dispersant may include, e.g., polyvinylpyrrolidone, polyethylene glycol 400, polyvinyl alcohol, or nitrile rubber.

A solvent may be further added when preparing the mixture. In an implementation, the solvent may include, e.g., an alcohol having 1 to 4 carbon atoms such as methanol, ethanol, propanol, butanol, or mixtures thereof.

The above-described heat treatment may be performed at, e.g., about 80° C. to about 250° C., about 90° C. to about 200° C., or about 100° C. to about 150° C.

In an implementation, the content of the metal precursor may be, e.g., about 5 parts by weight to about 20 parts by weight, based on 100 parts by weight of the carbon material. In an implementation, the content of the polyol may be, e.g., about 3 parts by weight to about 40 parts by weight, based on 100 parts by weight of the carbon material.

Then, the resultant may be washed with a solvent and then dried to prepare a metal-carbon composite including a metal, a carbon material, and a polyol. Drying may be performed at 100° C. or less, e.g., about 80° C. to about 100° C. or about 85° C. to about 95° C.

During the washing, ethanol, deionized water, or a mixture thereof may be used. Through the above-described washing process, the polyol used as a starting material may be partially removed.

When heat is used to prepare the metal-carbon composite, a reducing agent for the reaction of reducing a metal precursor to a metal may be used. In contrast, when light is used to prepare the metal-carbon composite, a separate reducing agent may not be used, compared to when heat is used to prepare the metal-carbon composite. Therefore, the method of preparing the metal-carbon composite using light may be environmentally friendly and reduce a preparation cost compared to the method of preparing the metal-carbon composite using heat.

In an implementation, the metal precursor may include, e.g., a metal nitrate, a metal sulfate, a metal chloride, a metal oxide, or a combination thereof. In an implementation, the metal may include, e.g., silver, zinc, silicon, tin, or a combination thereof.

In an implementation, the metal precursor may include, e.g., silver nitrate, zinc nitrate, tin nitrate, tin chloride, or zinc chloride. In an implementation, the solvent may include, e.g., methanol, ethanol, isopropanol, butanol, acetone, water, or a combination thereof. In an implementation, the solvent may include, e.g., a mixture of ethanol and water.

The metal-carbon composite may include, e.g., a silver-carbon composite (M-Carbon), a zinc-carbon composite, a silicon-carbon composite, a tin-carbon composite, or a combination thereof.

The metal-carbon composite included in the anode layer for the all-solid secondary battery according to an embodiment may have a bulk density of, e.g., about 0.1 g/cm$^3$ to about 0.5 g/cm$^3$, about 0.2 g/cm$^3$ to about 0.455 g/cm$^3$, about 0.3 g/cm$^3$ to about 0.45 g/cm$^3$, or about 0.35 g/cm$^3$ to about 0.45 g/cm$^3$, and a BET specific surface area of, e.g., about 40 m$^2$/g to about 60 m$^2$/g, about 45 m$^2$/g to about 55 m$^2$/g, or about 49 m$^2$/g to about 55 m$^2$/g.

In an infrared spectroscopic analysis of the metal-carbon composite included in the anode layer, an absorption peak may appear at a wave number of, e.g., about 750 cm$^{-1}$ to about 1,200 cm$^{-1}$, and another absorption peak may appear at a wave number of, e.g., about 3,250 cm$^{-1}$ to about 3,500 cm$^{-1}$. The absorption peak appearing at a wave number of about 750 cm$^{-1}$ to about 1,200 cm$^{-1}$ are related to glycerol (polyol) functional groups, and the absorption peak appearing at wave number of about 3,250 cm$^{-1}$ to about 3,500 cm$^{-1}$ are related to COOH or OH functional groups present on the surface of the carbon material of the metal-carbon composite. An intensity ratio of the CO (e.g., polyol) absorption peak appearing at a wave number of about 750 cm$^{-1}$ to about 1,200 cm$^{-1}$1 and the OH absorption peak of COOH and OH functional groups appearing at a wave number of about 3,250 cm$^{-1}$ to about 3,500 cm$^{-1}$ may be, e.g., 1:1.5 to 1:2.5, or 1:1.8 to 1:2.4, or 1:1.9 to 1:2.

In a thermogravimetric of the metal-carbon composite included in the anode layer, a weight loss may be, e.g., about 3 wt % to about 30 wt % at about 50° C. to about 150° C.

From the results of the above-described infrared spectroscopic analysis and thermogravimetric analysis, it may be confirmed that the polyol is contained or included in the metal-carbon composite.

According to another embodiment, there is provided an all-solid secondary battery including, e.g., a cathode layer, the anode layer according to an embodiment; and a solid electrolyte layer between the cathode layer and the anode layer and including a solid electrolyte. The anode layer may include the metal-carbon composite including a carbon material, a metal, and a polyol.

Hereinafter, all-solid secondary batteries according to embodiments will be described in more detail.

An all-solid secondary battery according to an embodiment may include, e.g., a cathode layer, an anode layer; and a solid electrolyte layer between the cathode layer and the anode layer. The cathode layer may include a cathode current collector and a cathode active material layer on the cathode current collector, and the anode layer may include a metal-carbon composite.

[All-Solid Secondary Battery]

Referring to FIG. 3, an all-solid secondary battery 1 may include, e.g., a cathode layer 10, an anode layer 20; and a solid electrolyte layer 30 between the cathode layer 10 and the anode layer 20. The cathode layer 10 may include a cathode current collector 11 and a cathode active material layer 12 on the cathode current collector 11. The anode layer 20 may include an anode current collector 21 and a first anode active material layer 22 on the anode current collector 21, and including the metal-carbon composite according to an embodiment.

[Cathode Layer: Cathode Current Collector]

In an implementation, the cathode current collector 11 may include, e.g., a plate or foil made of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In an implementation, the cathode current collector 11 may be omitted.

[Cathode Layer: Cathode Active Material]

In an implementation, the cathode active material layer 12 may include, e.g., a cathode active material and a solid electrolyte. The solid electrolyte included in the cathode layer 10 may be the same as or different from the solid electrolyte included in the solid electrolyte layer 30. For details of the solid electrolyte, refer to those of the solid electrolyte layer 30.

The cathode active material may be a cathode active material capable of reversibly absorbing and desorbing lithium ions. In an implementation, the cathode active material may include, e.g., a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), lithium manganate, lithium and iron phosphate, or a nickel sulfide, a copper sulfide, a lithium sulfide, an iron oxide, or a vanadium oxide, or the like. The cathode active materials may each be used alone or as a mixture of two or more thereof.

The lithium transition metal oxide may be a compound represented by e.g., $Li_aA_{1-b}B'_bD'_2$ (where $0.90 \leq a \leq 1$, and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$(where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$(where $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$(where $0.90 \leq a \leq 1$, and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where, $0.90 \leq a \leq 1$ and $0.001 \leq b \leq 0.1$); $Li_aNi_bCo_cMn_dGeO_2$(where, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1$ and $0.001 \leq b \leq 0.1$); $Li_aCoG_bO_2$ (where, $0.90 \leq a \leq 1$ and $0.001 \leq b \leq 0.1$); $Li_aMnG_bO_2$ (where, $0.90 \leq a \leq 1$ and $0.001 \leq b \leq 0.1$); $Li_aMn_2G_bO_4$ (where, $0.90 \leq a \leq 1$ and $0.001 \leq b \leq 0.0$; $QO_2$; $QS_2$; $LiQS_2$; $V_2O_5$; $LiV_2O_5$; $LiI'O_2$;

LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); or LiFePO$_4$. In the compounds, A may be, e.g., Ni, Co, Mn, or a combination thereof; B' may be, e.g., Al, Ni, Co, Mn, Cr, Fe, Mg, Sr, V, a rare earth element, or a combinations thereof; D' may be, e.g., O, F, S, P, or a combination thereof; E is Co, Mn, or a combination thereof; F' may be, e.g., F, S, P, or a combination thereof; G may be, e.g., Al, Cr, Mn, Fe, Mg, La, Ce, Sr, V, or a combination thereof; Q may be, e.g., Ti, Mo, Mn, or a combination thereof; I' may be, e.g., Cr, V, Fe, Sc, Y, or a combination thereof; and J may be, e.g., V, Cr, Mn, Co, Ni, Cu, or a combination thereof. A compound having a coating layer added on a surface thereof may be also used, and a mixture having the compound described above and a coating layer which are added thereto may be also used. The coating layer added to the surface of the compound may include, e.g., a coating element compound of an oxide, a hydroxide, an oxyhydroxide, an oxycarbonate, or a hydroxycarbonate of the coating element. The compound forming the coating layer may be amorphous or crystalline. The coating elements included in the coating layer may include, e.g., Mg, Al, Co, K, Na, Ca, Si, Ti, V, Sn, Ge, Ga, B, As, Zr, or a mixture thereof. A method of forming the coating layer may be a suitable method that does not adversely affect properties of the cathode active material. The coating method may include, e.g., spraying, coating, or dipping.

The cathode active material may include, e.g., a lithium salt of a transition metal oxide having a layered rock salt type structure among the above-described lithium transition metal oxides. The "layered rock salt type structure", e.g., may refer to a structure wherein an oxygen atom layer and a metal atom layer are alternately and regularly arranged in the direction of <111> of a cubic rock salt type structure, whereby each atom layer forms a two-dimensional plane. "Cubic rock salt type structure" may refer to a sodium chloride type (NaCl type) structure, which is a type of crystal structure, and, e.g., may have a structure in which face-centered cubic lattices (FCCs) forming each of cations and anions are arranged to be displaced from each other by ½ of a ridge of a unit lattice. A lithium transition metal oxide having the layered rock salt type structure may be a ternary lithium transition metal oxide, e.g., LiNi$_x$Co$_y$Al$_z$O$_2$ (NCA) or LiNi$_x$Co$_y$Mn$_z$O$_2$ (NCM) (0<x<1, 0<y<1, 0<z<1, x+y+z=1). When the cathode active material includes a ternary lithium transition metal oxide having a layered rock salt type structure, the energy density and thermal stability of the all-solid secondary battery 1 may be further improved.

The cathode active material may be covered by the coating layer as described above. The coating layer may be a suitable coating layer of a cathode active material of an all-solid secondary battery. The coating layer may include, e.g., Li$_2$O-ZrO$_2$ or the like.

When the cathode active material includes nickel (Ni) as a ternary lithium transition metal oxide, e.g., NCA or NCM, the capacity density of the all-solid secondary battery 1 may be increased, whereby metal elution of the cathode active material in a charged state may be reduced. As a result, cycle characteristics in the charge state of the all-solid secondary battery 1 are improved.

The shape of the cathode active material may be, e.g., a sphere or an elliptical sphere. The particle diameter of the cathode active material may be within a suitable range applicable to an all-solid secondary battery. The content of the cathode active material in the cathode layer 10 may be within a suitable range applicable to an all-solid secondary battery.

[Cathode Layer: Solid Electrolyte]

The cathode active material layer 12 may include, e.g., a solid electrolyte. The solid electrolyte included in the cathode layer 10 may be the same as or different from the solid electrolyte included in the solid electrolyte layer 30. For details of the solid electrolyte, refer to those of the solid electrolyte layer 30.

The solid electrolyte included in the cathode active material layer 12 may have a smaller average particle diameter D50 than the solid electrolyte included in the solid electrolyte layer 30. In an implementation, the average particle diameter D50 of the solid electrolyte included in the cathode active material layer 12 may be, e.g., 90% or less, 80% or less, 70% or less, 60% or less, 50% or less, 40% or less, 30% or less, or 20% or less of the average particle diameter D50 of the solid electrolyte included in the solid electrolyte layer 30.

[Cathode Layer: Binder]

The cathode active material layer 12 may include a binder. The binder may include, e.g., styrene butadiene rubber (SBR), polytetrafluoroethylene, polyvinylidene fluoride, polyethylene, or the like.

[Cathode Layer: Conductive Material]

The cathode active material layer 12 may include a conductive material. The conductive material may include, e.g., graphite, carbon black, acetylene black, Ketjen black, carbon fiber, metal powder, or the like.

[Cathode Layer: Other Additives]

In an implementation, the cathode layer 10 may further include additives, e.g., a filler, a coating agent, a dispersing agent, or an ion-conductive auxiliary agent, in addition to the above-described cathode active material, solid electrolyte, binder, and conductive material.

As the filler, coating agent, dispersing agent and ion-conductive auxiliary agent included in the cathode layer 10, e.g., suitable materials used for electrodes of all-solid secondary batteries may be used.

[Solid Electrolyte Layer]

The solid electrolyte may be a sulfide solid electrolyte.

[Solid Electrolyte Layer: Sulfide Solid Electrolyte]

Figure 4:
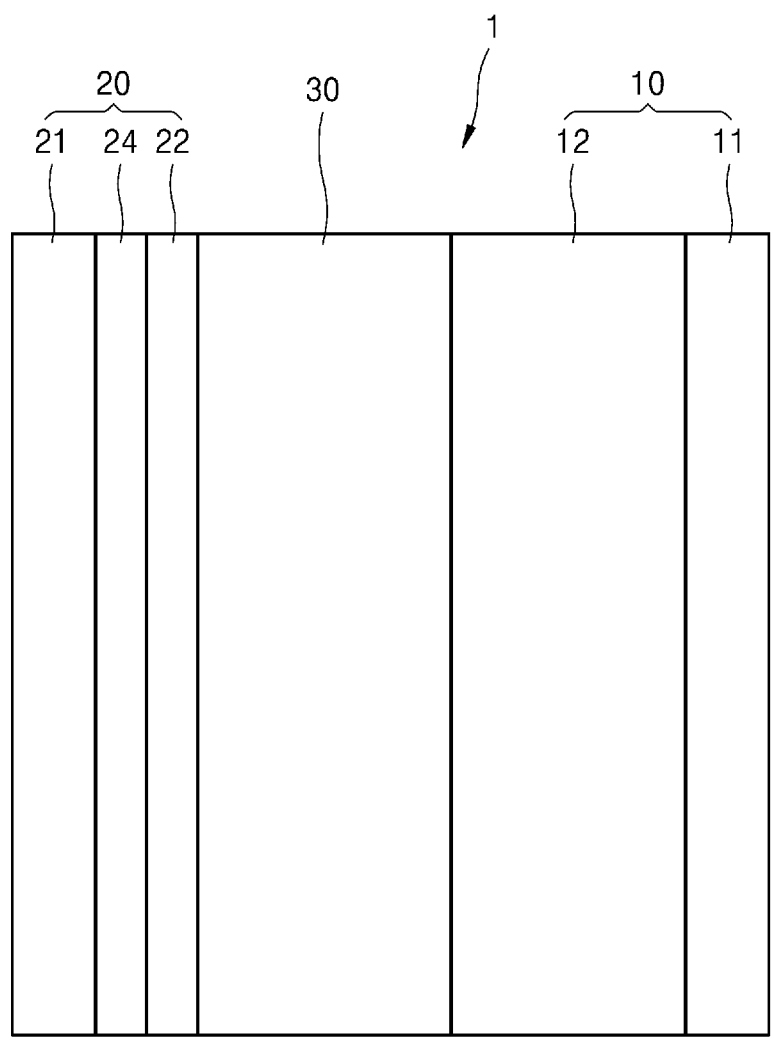
Figure 5:
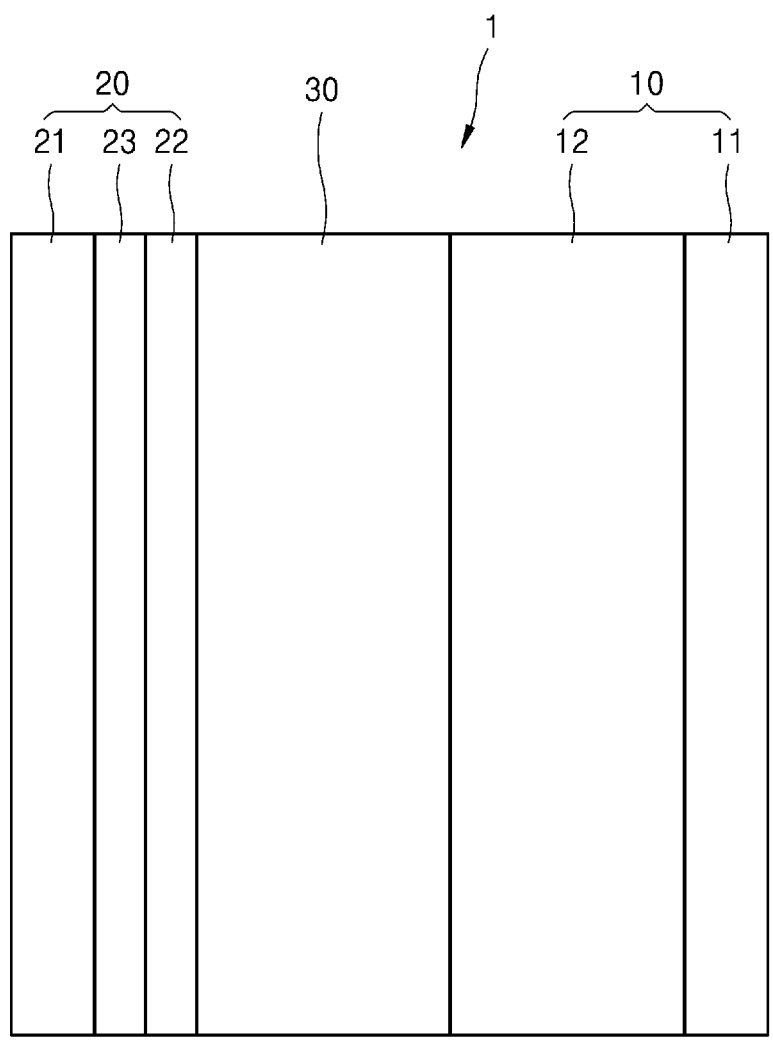

Referring to FIGS. 3 to 5, the solid electrolyte layer 30 may include, e.g., a sulfide solid electrolyte between the cathode layer 10 and the anode layer 20.

In an implementation, the sulfide solid electrolyte may include, e.g., P$_2$S$_5$, Li$_2$S—P$_2$S$_5$-LiX (where X is a halogen element), Li$_2$S—P$_2$S$_5$—Li$_2$O, Li$_2$S—P$_2$S$_5$-Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$-Z$_m$S$_n$, (where m and n are each a positive number, and Z is Ge, Zn or Ga), Li$_2$S—GeS$_2$, Li$_2$S—SiS$_2$—Li$_3$PO$_4$, Li$_2$S—SiS$_2$—Li$_p$MO$_q$ (where p and q are each a positive number, and M is P, Si, Ge, B, Al, Ga, or In), Li$_{7-x}$PS$_{6-x}$Cl$_x$ (0≤x≤2), Li$_{7-x}$PS$_{6-x}$Br$_x$ (0≤x≤2), or Li$_{7-x}$PS$_{6-x}$I$_x$ (0≤x≤2). The sulfide solid electrolyte may be prepared by treating a starting material, e.g., Li$_2$S or P$_2$S$_5$, by a melt quenching method or a mechanical milling method. After this treatment, heat treatment may be performed. The solid electrolyte may be amorphous, crystalline, or a mixed state thereof. The solid electrolyte may include, e.g., sulfur (S), phosphorus (P), and lithium (Li) as at least constituent elements among the above-described sulfide solid electrolyte materials. In an implementation, the solid electrolyte may be a material including, e.g., Li$_2$S—P$_2$S$_5$. When a solid electrolyte including Li$_2$S—P$_2$S$_5$ as a material of the sulfide solid electrolyte forming the solid electrolyte, a mixing molar ratio of Li$_2$S and P$_2$S$_5$ may be, e.g., in a range of about Li$_2$S: P$_2$S$_5$=50:50 to 90:10.

The sulfide solid electrolyte may be an argyrodite compound including, e.g., $Li_{7-x}$—$PS_{6-x}Cl_x$ (0≤x≤2), $Li_{7-x}PS_{6-x}Br_x$ (0≤x≤2), or $Li_{7-x}PS_{6-x}I_x$ (0≤x≤2). In an implementation, the sulfide solid electrolyte may be, e.g., an argyrodite compound including $Li_6PS_5Cl$, $Li_6PS_5Br$, or $Li_6PS_5I$.

The density of the argyrodite solid electrolyte may be, e.g., about 1.5 g/cc to about 2.0 g/cc. Maintaining the density of the argyrodite solid electrolyte at about 1.5 g/cc or more may help ensure that the internal resistance of the all-solid secondary battery may be reduced, and that the penetration of the solid electrolyte by Li may be effectively suppressed.

An elastic modulus of the solid electrolyte may be, e.g., about 15 GPa to about 35 GPa.

[Solid Electrolyte Layer: Binder]

The solid electrolyte layer 30 may include, e.g., a binder. In an implementation, the binder included in the solid electrolyte layer 30 may include a suitable binder, e.g., styrene butadiene rubber (SBR), polytetrafluoroethylene, polyvinylidene fluoride, polyethylene, or the like. The binder included in the solid electrolyte layer 30 may be the same as or different from the binder included in the cathode active material layer 12 and the anode active material layer 22.

[Anode Layer]
[Structure of Anode Layer]

A thickness of the first anode active material layer 22 may be, e.g., 50% or less, 40% or less, 30% or less, 20% or less, 10% or less, or 5% or less of the thickness of the cathode active material layer. In an implementation, the thickness of the first anode active material layer may be, e.g., about 1 μm to about 20 μm, about 2 μm to about 10 μm, or about 3 μm to about 7 μm. If the first anode active material layer were to be too thin, lithium dendrites formed between the first anode active material layer 22 and the anode current collector 21 could collapse the first anode active material layer 22, so that it could be difficult to improve the cycle characteristics of the all-solid secondary battery 1. If the thickness of the anode active material layer were to be too thick, the energy density of the all-solid secondary battery 1 could decrease, and the internal resistance of the all-solid secondary battery 1 by the first anode active material layer could increase, so that it could be difficult to improve the cycle characteristics of the all-solid secondary battery 1.

When the thickness of the first anode active material layer decreases, e.g., the charging capacity of the first anode active material layer also decreases. The charging capacity of the first anode active material layer 22 may be, e.g., 50% or less, 40% or less, 30% or less, 20% or less, 10% or less, 5% or less, or 2% or less of the charging capacity of the cathode active material layer 12. The charging capacity of the first anode active material layer 22 may be, e.g., about 0.1% to about 50%, about 0.1% to about 40%, about 0.1% to about 30%, about 0.1% to about 20%, about 0.1% to about 10%, about 0.1% to about 5%, or about 0.1% to about 2% of the charging capacity of the cathode active material layer 12. If the charging capacity of the first anode active material layer 22 were to be too small, the first anode active material layer 22 could become very thin. Therefore, lithium dendrites formed between the first anode active material layer 22 and the anode current collector 21 during repeated charging and discharging processes could collapse the first anode active material layer 22, so that it could difficult to improve the cycle characteristics of the all-solid secondary battery 1. If the charging capacity of the first anode active material layer 22 were to be too large, the energy density of the all-solid secondary battery 1 could decrease, and the internal resistance of the all-solid secondary battery 1 by the first anode active material layer 22 could increase, so that it could be difficult to improve the cycle characteristics of the all-solid secondary battery 1.

The charging capacity of the cathode active material layer 12 may be obtained by multiplying the charging capacity density (mAh/g) of the cathode active material by the mass of the cathode active material in the cathode active material layer 12. When several types of cathode active materials are used, the values of charge capacity density x mass may be calculated for respective cathode active materials, and the sum of these values is the charging capacity of the cathode active material layer 12. The charging capacity of the first anode active material layer 22 may be calculated in the same way. In an implementation, the charging capacity of the anode active material layer 22 may be obtained by multiplying the charging capacity density (mAh/g) of the anode active material by the mass of the anode active material in the anode active material layer 22. When several types of anode active materials are used, the values of charge capacity density x mass may be calculated for respective anode active materials, and the sum of these values is the charging capacity of the anode active material layer 22. In an implementation, the charge capacity densities of the cathode active material and the anode active material may be estimated using an all-solid half-cell using lithium metal as a counter electrode. The charging capacities of the cathode active material layer 12 and the first anode active material layer 22 may be directly measured by the measurement of the charging capacity using the all-solid half-cell. When the measured charge capacity is divided by the mass of each active material, the charging capacity density is obtained. In an implementation, the charging capacities of the cathode active material layer 12 and the first anode active material layer 22 may be initial charging capacities measured during the first charging cycle.

[Anode Layer: Anode Current Collector]

The anode current collector 21 may be made of or include, e.g., a material that does not react with lithium, e.g., does not form both an alloy and a compound. In an implementation, the material constituting the anode current collector 21 may include, e.g., copper (Cu), stainless steel, titanium (Ti), iron (Fe), cobalt (Co), or nickel (Ni), or other suitable material for an electrode current collector. In an implementation, the thickness of the anode current collector may be about 1 μm to about 20 μm, e.g., about 5 μm to about 15 μm, or about 7 μm to about 10 μm.

The anode current collector 21 may be made of one of the above-described metals or an alloy of two or more metals, or may be made of a coating material. The anode current collector 21 may be in the form of a plate or foil.

In an implementation, referring to FIG. 4, the all-solid secondary battery 1 may further include, e.g., a thin film 24 including an element capable of forming an alloy with lithium on the anode current collector 21. The thin film 24 may be between the anode current collector 21 and the first anode active material layer 22. The thin film 24 may include, e.g., an element capable of forming an alloy with lithium. Examples of the element capable of forming an alloy with lithium may include gold, silver, zinc, tin, indium, silicon, aluminum, and bismuth. Another suitable element may be used as long as it forms an alloy with lithium in the art. The thin film 24 may be formed of one of these metals or is formed of an alloy of several types of metals. The thin film 24 may be on the anode current collector 21, e.g., the deposition form of the second anode active material layer deposited between the thin film 24 and the first anode active material layer 22 may be further flattened, and the cycle characteristics of the all-solid secondary battery 1 may be further improved.

A thickness of the thin film may be, e.g., about 1 nm to about 800 nm, about 10 nm to about 700 nm, about 50 nm to about 600 nm, or about 100 nm to about 500 nm. Maintaining the thickness of the thin film 24 at about 1 nm or greater may help ensure that it may function as the thin film 24. If the thickness of the thin film 24 were to be too thick, the thin film 24 itself could absorb lithium to decrease the amount of lithium deposited in the anode layer, so that the energy density of the all-solid battery could decrease, and the cycle characteristics of the all-solid secondary battery 1 could be deteriorated. In an implementation, the thin film 24 may be formed on the anode current collector 21 by, e.g., a vacuum deposition method, a sputtering method, a plating method, or the like, or other suitable method.

[Anode Layer: Anode Active Material]

The first anode active material layer 22 may include the metal-carbon composite according to an embodiment.

[Anode Layer: Deposition Layer]

In an implementation, referring to FIG. 5, the all-solid secondary battery 1 may further include a second anode active material layer 23 between the anode current collector 21 and the first anode active material layer 22 by charging. In an implementation, the all-solid secondary battery 1 may further include a second anode active material layer 23 disposed between the solid electrolyte layer 30 and the first anode active material layer 22 by charging. The second anode active material layer 23 may be a metal layer including lithium or a lithium alloy. The metal layer may include lithium or a lithium alloy. In an implementation, the second anode active material layer 23 may be a metal layer including lithium, and it may function as, e.g., a lithium reservoir. Examples of the lithium alloy may include a Li—Al alloy, a Li—Sn alloy, a Li—In alloy, a Li—Ag alloy, a Li—Au alloy, a Li—Zn alloy, a Li—Ge alloy, and a Li—Si alloy, or other suitable lithium alloy. The second anode active material layer 23 may be made of one of these alloys or lithium, or may be made of several kinds of alloys.

In an implementation, the thickness of the second anode active material layer may be, e.g., about 1 μm to about 1,000 μm, about 1 μm to about 500 μm, about 1 μm to about 200 μm, about 1 μm to about 150 μm, about 1 μm to about 100 μm, or about 1 μm to about 50 μm. If the thickness of the second anode active material layer were to be too thin, it could be difficult for the second anode active material layer 23 to effectively serve as a lithium reservoir. If the thickness of the second anode active material layer were to be too thick, the mass and volume of the all-solid secondary battery 1 could increase, and the cycle characteristics thereof could be deteriorated. The second anode active material layer 23 may be, e.g., a metal foil having a thickness within this range.

In the all-solid secondary battery 1, the second anode active material layer 23 may be formed between the anode current collector 21 and the first anode active material layer 22 before assembly of the all-solid secondary battery 1 or may be formed between the anode current collector 21 and the first anode active material layer 22 by charging after assembly of the all-solid secondary battery 1.

When the second anode active material layer 23 is formed between the anode current collector 21 and the first anode active material layer 22 before assembly of the all-solid secondary battery 1, the second anode active material layer 23 may be a metal layer including lithium, and it may function as a lithium reservoir. The cycle characteristics of the all-solid secondary battery 1 including the second anode active material layer 23 may be further improved. In an implementation, a lithium foil may be formed between the anode current collector 21 and the first anode active material layer 22 before assembly of the all-solid secondary battery 1.

When the second anode active material layer 23 is formed by charging after assembly of the all-solid secondary battery 1, the second anode active material layer 23 may not be included during assembly of the all-solid secondary battery 1, so that the energy density of the all-solid secondary battery 1 may increase. In an implementation, when charging the all-solid secondary battery 1, the all-solid secondary battery 1 may be charged to exceed the charging capacity of the first anode active material layer 22. In an implementation, the first anode active material layer 22 may be overcharged. At the initial stage of charging, lithium may be absorbed in the first anode active material layer 22. In an implementation, the anode active material included in the first anode active material layer 22 may form an alloy or compound with lithium ions that have migrated from the cathode layer 10. When the all-solid secondary battery 1 is charged to exceed the charging capacity of the first anode active material layer 22, e.g., lithium may be deposited on the rear surface of the first anode active material layer 22, e.g., between the anode current collector 21 and the first anode active material layer 22, and a metal layer corresponding to the second anode active material layer 23 may be formed by the deposited lithium. The second anode active material layer 23 may be a metal layer mainly including lithium (e.g., metal or non-compounded lithium). Such a result is obtained, e.g., when the anode active material included in the first anode active material layer 22 is composed of a material that forms an alloy or compound with lithium. During discharging, lithium in the first anode active material layer 22 and the second anode active material layer 23, e.g., the metal layer may be ionized and may move toward the cathode layer 10. Accordingly, it is possible to use lithium as an anode active material in the all-solid secondary battery 1. In an implementation, the first anode active material layer 22 may cover the second anode active material layer 23, and it may serve as a protective layer for the second anode active material layer 23, e.g., the metal layer, and may help suppress the deposition growth of lithium dendrites. In an implementation, the short circuit and capacity reduction of the all-solid secondary battery 1 may be suppressed, and as a result, the cycle characteristics of the all-solid secondary battery 1 may be improved. In an implementation, when the second anode active material layer 23 is formed by charging after assembly of the all-solid secondary battery 1, the anode current collector 21 and the first anode active material layer 22 and the region therebetween may be, e.g., Li-free regions that do not include lithium (Li) in the initial state or post-discharge state of the all-solid secondary battery.

Next, a method of manufacturing an all-solid secondary battery according to an embodiment will be described.

The method may include, e.g., providing the anode layer according to an embodiment; providing a cathode layer; providing a solid electrolyte layer between the anode layer and the cathode layer to prepare a laminate; and pressing the laminate.

The pressing of the laminate may be performed at a temperature of, e.g., about 25° C. to about 90° C., and the laminate may be pressed at a pressure of, e.g., 550 MPa or lower, about 500 MPa or lower, or about 400 MPa to about 500 MPa, thereby completing an all-solid secondary battery.

The pressing time may vary depending on temperature and pressure, and may be, e.g., less than 30 minutes. The pressing may include, e.g., isostatic pressing, roll pressing, or plate pressing.

The thickness of the pressed cathode active material layer may be, e.g., about 100 µm to about 150 µm, the thickness of the pressed anode active material layer may be, e.g., about 10 µm to about 15 µm, and the thickness of the solid electrolyte layer may be, e.g., about 100 µm to about 150 µm.

The all-solid secondary battery according to an embodiment may be applicable to medium and large batteries or an energy storage system (ESS).

A method of manufacturing an all-solid secondary battery according to another embodiment will be described.

An all-solid secondary battery may be manufactured by, e.g., providing an anode layer including an anode current collector and a first anode active material layer; providing a cathode layer; providing a solid electrolyte layer between the anode layer and the cathode layer to prepare a laminate; and pressing the laminate.

The first anode active material layer may include, e.g., a metal-carbon composite including a metal, carbon, and a polyol.

In the process of providing the anode layer, the anode layer may be prepared by applying a composition including a metal-carbon composite, a binder, and a solvent onto the anode current collector and drying the composition.

As the binder, an aqueous binder, an organic binder, or a combination thereof may be used. As the binder, e.g., polyvinyl alcohol, carboxymethyl cellulose, hydroxypropyl cellulose, diacetyl cellulose, polyvinyl chloride, carboxylated polyvinyl chloride, polyvinyl fluoride, polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, or a combination thereof may be used.

As the aqueous binder, styrene butadiene rubber (SBR), carboxymethyl cellulose (CMC), or a combination thereof may be used. When using the aqueous binder, water may be used as a solvent.

As the organic binder, polytetrafluoroethylene, polyvinylidene fluoride, or the like may be used. When using such an organic binder, N-methylpyrrolidone (NMP) or the like may be used as a solvent.

The metal-carbon composite may be prepared as described above by, e.g., mixing a carbon material, a metal precursor, a polyol, and a solvent to obtain a mixture; and applying light or heat to the mixture.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATION EXAMPLE 1

Preparation of Metal-Carbon Composite (M-Carbon)

In a 100 mL reactor, 50 mL of glycerol (99.9%, Aldrich) and 0.5 mmol of polyvinylpyrrolidone (PVP) (Mw=55,000, Aldrich) were heated to 80° C. The resultant was mixed until it became a transparent solution, and then cooled to 30° C. to obtain a reaction mixture. Subsequently, 5 g of a first carbon black was added to the reaction mixture and mixing was performed for 10 minutes, and then 50 mmol of $AgNO_3$ (99.9%, Aldrich) was added thereto and mixing was performed for 5 minutes. This mixture was heated to 100° C., and then reaction was performed for 12 hours. The first carbon black had a primary particle size of about 38 nm, a specific surface area of 54 $m^2/g$, and a bulk density of 0.31 $g/cm^3$.

50 mL of deionized water (DI water) was added, and then sonication was performed for 2 minutes. Subsequently, glycerol, which is a solvent, PVP, and the first carbon black were separated from each other using a glass filter, and the separated first carbon black was washed using ethanol and deionized water (DI water).

After the washing, drying was performed in a vacuum oven at 90° C. for 8 hours or more to prepare a metal-carbon composite (M-Carbon). In the silver-carbon composite, the content of silver was 5 wt %, the content of carbon was 90 wt %, and the content of glycerol was 5 wt %.

PREPARATION EXAMPLES 2 and 3

Silver-carbon composites (M-Carbon) were prepared in the same manner as in Preparation Example 1, except that the content of glycerol in the mixture was changed such that the contents of glycerol in the silver-carbon composites were 3 wt % and 40 wt %, respectively.

PREPARATION EXAMPLE 4

A silver-carbon composite (M-Carbon) was prepared in the same manner as in Preparation Example 1, except that a second carbon black was used instead of the first carbon black, and that the content of glycerol in the mixture was changed such that the content of glycerol in the finally obtained silver-carbon composite was 30 wt %. In the silver-carbon composite obtained according to Preparation Example 4, the content of silver was 5 wt %, the content of carbon was 65 wt %, and the content of glycerol was 30 wt %.

The second carbon black had a primary particle size of about 33 nm, a specific surface area of 62 $m^2/g$, and a bulk density of 0.16 $g/cm^3$.

COMPARATIVE PREPARATION EXAMPLE 1

A silver-carbon composite (M-Carbon) was prepared in the same manner as in Preparation Example 1, except that glycerol was not used in the preparation of the mixture. In the silver-carbon composite obtained according to Comparative Preparation Example 1, the content of silver was 5 wt %, and the content of carbon was 95 wt %.

COMPARATIVE PREPARATION EXAMPLE 2

A silver-carbon composite (M-Carbon) was prepared in the same manner as in Preparation Example 4, except that glycerol was not used in the preparation of the mixture. In the silver-carbon composite obtained according to Comparative Preparation Example 2, the content of silver was 5 wt %, and the content of carbon was 95 wt %.

EXAMPLE 1

(Manufacturing of Anode Layer)

A SUS foil having a thickness of 10 μm was prepared as an anode current collector. 9.2 g of the silver-carbon composite powder obtained in Preparation Example 1 having an average particle diameter of about 30 nm, as an anode active material, was introduced into a container, and 0.8 g of SBR and CMC (aqueous binders) at a weight ratio of 2:1, were added thereto to prepare a mixed solution. Subsequently, the mixed solution was stirred while adding 30 g of water little by little to this mixed solution to prepare a slurry. The slurry was applied onto the SUS foil using a bar coater, and dried in a convection oven at 80° C. for 10 minutes to obtain a laminate. The obtained laminate was dried in vacuum at 40° C. for 10 hours. An anode layer in which the first anode active material layer is formed on the anode current collector was manufactured by the above processes.

(Manufacturing of Solid Electrolyte Layer)

An acrylic binder (SX-A334, Zeon Co., Ltd.) was added to octyl acetate to prepare a 4 wt % binder solution. The acrylic binder solution was added to a solid electrolyte $Li_6PS_5Cl$ (D50=3 μm, crystalline), which is an argyrodite crystal, followed by mixing using a Thinky mixer to prepare a slurry. The slurry includes 1.5 parts by weight of the acrylic binder with respect to 98.5 parts by weight of the solid electrolyte. The slurry was applied onto a non-woven fabric using a bar coater, and dried in a convection oven at 80° C. for 10 minutes to obtain a laminate. The obtained laminate was dried in vacuum at 70° C. for 2 hours. A solid electrolyte layer was manufactured by the above processes.

(Manufacturing of Cathode Layer)

$LiNi_{0.8}Co_{0.15}Mn_{0.05}O_2$ (NCM) was prepared as a cathode active material. $Li_6PS_5Cl$ (D50=1 μm or less, crystalline), which is an argyrodite crystal, was used as a solid electrolyte. Further, a polytetrafluoroethylene (PTFE) binder (Teflon binder of DuPont Corporation) was used as a binder, and carbon black (CB) and carbon nanofibers (CNF) were used as a conducting agent. A cathode active material composition in which these materials were mixed with a xylene solvent at a weight ratio of cathode active material: solid electrolyte: carbon black: carbon nanofiber: binder=85.5:10: 1.5:1.5:1.5 was molded into a sheet, followed by drying in vacuum at 40° C. for 8 hours to manufacture a cathode sheet.

(Manufacturing of All-Solid Secondary Battery)

The solid electrolyte layer was disposed between the cathode layer and the anode layer to prepare a laminate. The laminate was isotactic-pressed at a pressure of 490 MPa at 80° C. for 60 minutes to manufacture an all-solid secondary battery. The solid electrolyte was sintered by such isotactic-pressing, thereby improving battery characteristics. The thickness of the sintered solid electrolyte layer was about 45 μm. The thickness of the pressed cathode active material layer was about 120 μm, the thickness of the pressed anode active material layer was 12 μm, and the thickness of the pressed solid electrolyte layer was 120 μm.

EXAMPLES 2 to 4

Anode layers and all-solid secondary batteries were manufactured in the same manner as in Example 1, except that the silver-carbon composites of Preparation Examples 2 to 4 were used instead of the silver-carbon composite of Preparation Example 1, respectively, in the manufacturing of the anode layer.

COMPARATIVE EXAMPLES 1 and 2

Anode layers and all-solid secondary batteries were manufactured in the same manner as in Example 1, except that the silver-carbon composite of Comparative Preparation Example 1 and the silver-carbon composite of Comparative Preparation Example 2 were used instead of the silver-carbon composite of Preparation Example 1, respectively, in the preparation of the slurry for manufacturing the anode layer.

COMPARATIVE EXAMPLE 3

An anode layer and an all-solid secondary battery were manufactured in the same manner as in Example 1, except that 95 wt % of the first carbon black and 5 wt % of Ag (d50=50 nm) were used instead of the silver-carbon composite of Preparation Example 1 in the preparation of the slurry for manufacturing the anode layer.

COMPARATIVE EXAMPLE 4

An anode layer and an all-solid secondary battery were manufactured in the same manner as in Example 1, except that 95 wt % of the second carbon black and 5 wt % of Ag (d50=50 nm) were used instead of the silver-carbon composite of Preparation Example 1 in the preparation of the slurry for manufacturing the anode layer.

COMPARATIVE EXAMPLE 5

An all-solid secondary battery was manufactured in the same manner as in Example 1, except that the anode layer was manufactured according to processes to be described below.

(Manufacturing of Anode Layer)

A SUS or Ni foil having a thickness of 10 μm was prepared as an anode current collector. Further, 0.25 g of the silver-carbon composite powder obtained in Comparative Preparation Example 1 and 0.11 g of glycerol, as anode active materials, was introduced into a container, and 2 g of an SBR binder was added thereto to prepare a mixed solution. Subsequently, the mixed solution was stirred while adding NMP little by little to this mixed solution to prepare a slurry. The slurry was applied onto the foil using a bar coater, and dried in a convection oven at 80° C. for 10 minutes to obtain a laminate. The obtained laminate was dried in vacuum at 40° C. for 10 hours. An anode layer in which the first anode active material layer is formed on the anode current collector was manufactured by the above processes.

EVALUATION EXAMPLE 1

Infrared Spectroscopic Analysis (Infrared Spectroscopy)

Infrared spectroscopic analysis was performed on the silver-carbon composite prepared according to Preparation Example 1 and the first carbon black (Reference Example 1). Infrared spectra were measured using a Nicolet iS10 spectrometer (Thermo Scientific, Waltham, MA, USA). The results of infrared spectroscopic analysis are shown in FIG. 1.

Referring to FIG. 1, in the first carbon black, an absorption peak appeared at a wave number of 3,250 $cm^{-1}$ to 3,500 $cm^{-1}$. In contrast, in the silver-carbon composite of Preparation Example 1, absorption peaks appeared at a wave number of 750 $cm^{-1}$ to 1,200 $cm^{-1}$ and at a wave number of 3,250 $cm^{-1}$ to 3,500 $cm^{-1}$. From this, it may be seen that the silver-carbon composite contained glycerol. Further, it may be seen that the intensity ratio of a C—O absorption peak appearing at a wave number of 750 $cm^{-1}$ to 1,200 $cm^{-1}$ and an O—H absorption peak appearing at a wave number of 3,250 $cm^{-1}$ to 3,500 $cm^{-1}$ was 1:2.3.

EVALUATION EXAMPLE 2

Thermogravimetric Analysis

Thermogravimetric analysis was performed on the silver-carbon composite prepared according to Preparation Example 1 and the composite of Comparative Preparation Example 1. Thermogravimetric analysis was performed using a TGA8000 from PerkinElmer Inc. The results of thermogravimetric analysis of the silver-carbon composite prepared according to Preparation Example 1 and the composite CB35 of Comparative Preparation Example 1 are shown in FIGS. 2A and 2B.

Figure 2A:
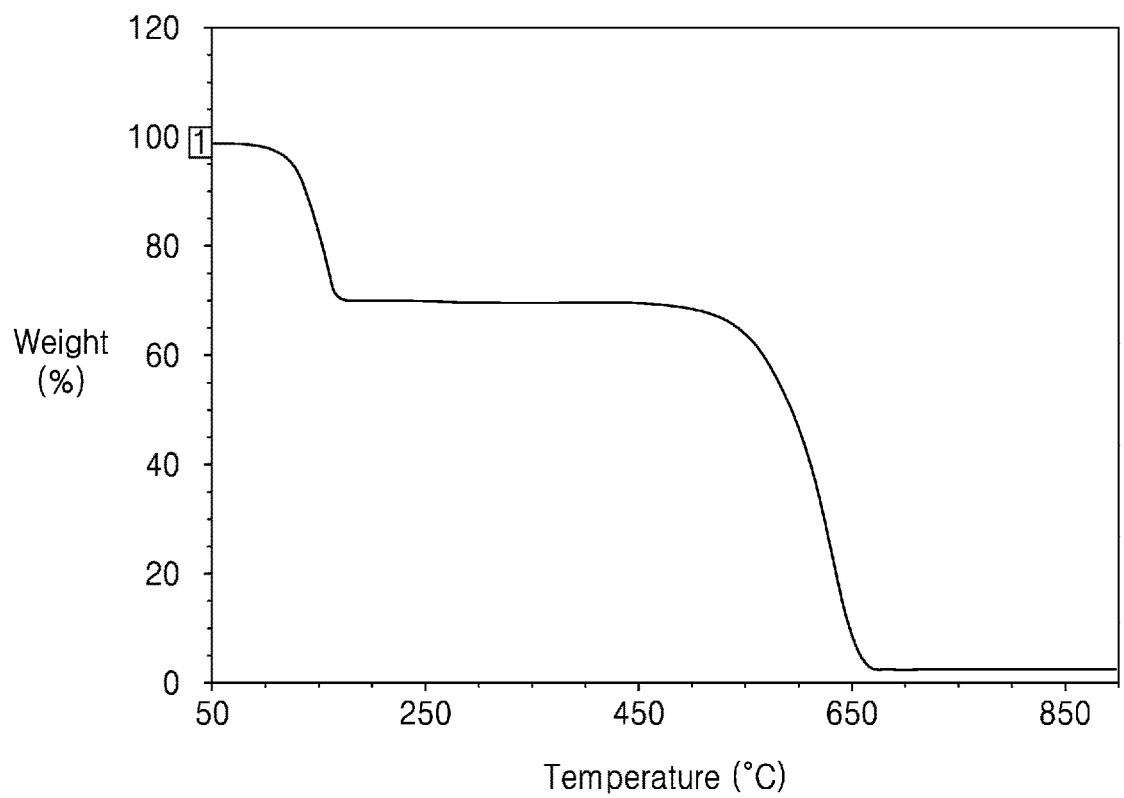
FIGS. 2A and 2B are thermogravimetric analysis graphs of the silver-carbon composite prepared according to Preparation Example 1 and the first carbon black, respectively.
Figure 2B:
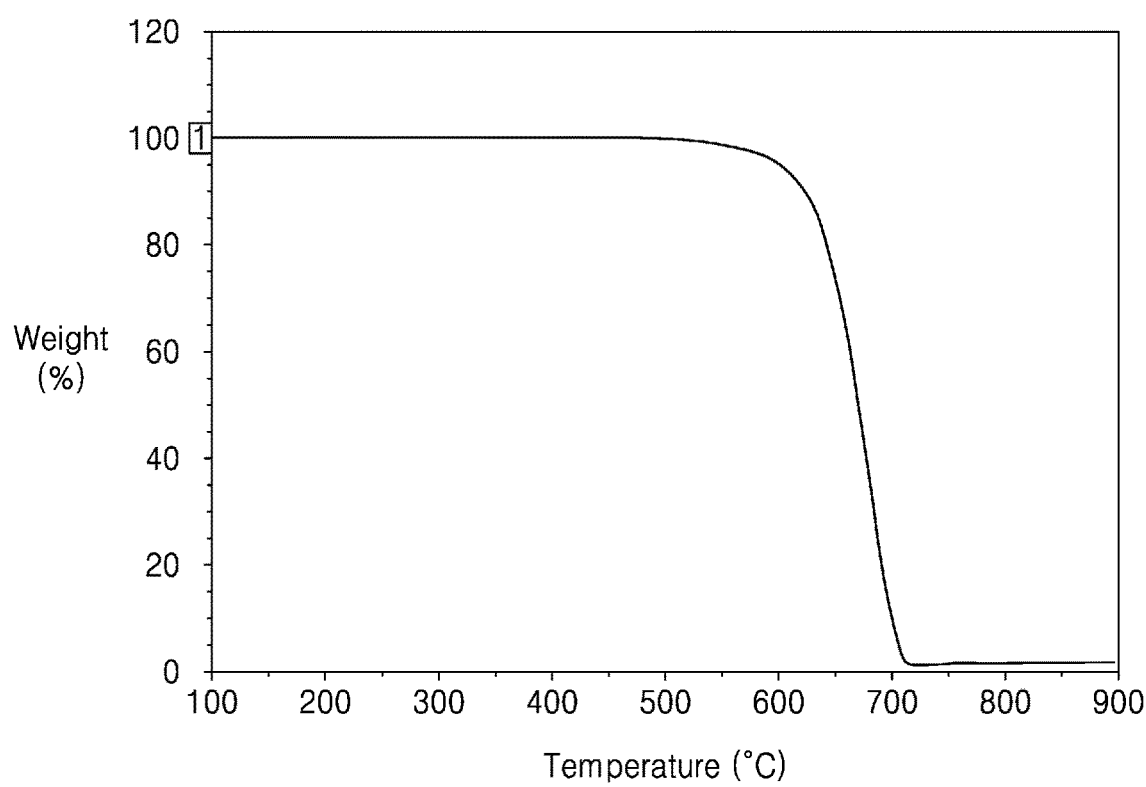

In the silver-carbon composite of Preparation Example 1, as shown in FIG. 2A, a weight loss of about 30% was observed at 50° C. to 150° C. In contrast, in the composite of Comparative Preparation Example 1, as shown in FIG. 2B, unlike the silver-carbon composite of Preparation Example 1, a weight loss was not observed at 50° C. to 150° C. From this, it was indirectly found that the silver-carbon composite of Preparation Example 1 contained glycerol.

EVALUATION EXAMPLE 3

Bulk Density and BET Surface Area

Bulk densities and BET specific surface areas for the composites prepared according to Preparation Examples 1 to 4 and Comparative Preparation Examples 1 and 2 were measured, and the results thereof are shown in Table 1 below. Bulk density was measured using a bulk density tester (Hosokawa Powder Characteristics Tester: Model PT-N) available from Hosokawa Micron, Osaka, Japan.

TABLE 1

| Class. | Bulk density (g/cm³) | BET surface area (m²/g) |
| --- | --- | --- |
| Preparation Example 1 | 0.37 | 54 |
| Preparation Example 2 | 0.39 | 51 |
| Preparation Example 3 | 0.45 | 48 |
| Preparation Example 4 | 0.45 | 50 |
| Comparative Preparation Example 1 | 0.31 | 55 |
| Comparative Preparation Example 2 | 0.16 | 55 |

Referring to Table 1, it may be seen that the composites of Examples 1 to 4 had about the same level of BET specific surface area as the composites of Comparative Preparation Examples 1 and 2, but had improved bulk density, when compared to the composites of Comparative Preparation Examples 1 and 2. As such, when the bulk density is improved, accurate metering may be performed and loss of raw materials may be reduced during the preparation of a slurry.

EVALUATION EXAMPLE 4

Physical Properties of Electrode Plate

The adhesive forces and porosities of the anode layers manufactured according to Examples 1 to 4 and Comparative Examples 1 and 2 were measured, and the results thereof shown in Table 2 below.

In evaluation of the adhesive force of the anode layer, after the anode layer was pressed, the surface thereof was cut and fixed on a slide glass, and peel strength was measured at 180° while peeling off the current collector, and the results thereof are shown in Table 3 below. In the evaluation of adhesive force, five or more peel strengths were measured using INSTRON's UTM tensile strength meter, and the average value thereof was determined. Further, the porosity of the anode layer was measured using an Autopore IV mercury porosity meter of Micromeritics Instrument Corporation.

TABLE 2

| Class. | Adhesive force (gf/mm) | Porosity (%) |
| --- | --- | --- |
| Example 1 | 110 | 16 |
| Example 2 | 125 | 9 |
| Example 3 | 132 | 7 |
| Example 4 | 135 | 19 |
| Comparative Example 1 | 96 | 20 |
| Comparative Example 2 | 98 | 19 |

As shown in Table 2, the anode layers of Examples 1 to 3 had lower porosity and improved adhesive force compared to the anode layer of Comparative Example 1. The anode layer of Comparative Example 2 had the same porosity as the anode layer of Example 4, but exhibited a lowered adhesive force compared to the anode layer of Example 4.

From this, it may be inferred that the occurrence rate of short circuits would be improved when the anode layers of Examples 1 to 3 were used.

EVALUATION EXAMPLE 5

Charge-Discharge Test

The charge-discharge characteristics of the all-solid secondary batteries manufactured in Examples 1 to 4 and Comparative Examples 1 to 5 were evaluated by the following charge-discharge test. The charge-discharge test was performed after putting the all-solid secondary battery into a thermostat bath at 60° C.

The battery was charged for about 10 hours with a constant current of 0.1 C until the battery voltage was 4.25 V, and then the battery was discharged for about 10 hours with a constant current of 0.05 C until the battery voltage was 2.5 V (first cycle).

Subsequently, the battery was charged for about 10 hours with a constant current of 0.1 C until the battery voltage was 4.25 V, and then the battery was discharged for about 3 hours with a constant current of 0.33 C until the battery voltage was 2.5 V (second cycle).

Thereafter, the battery was charged for about 10 hours with a constant current of 0.1 C until the battery voltage was 4.25 V. Subsequently, the battery was discharged for about 2 hours with a constant current of 0.5 C until the battery voltage was 2.5 V (third cycle).

Thereafter, the battery was charged for about 10 hours with a constant current of 0.1 C until the battery voltage was 4.25 V. Subsequently, the battery was discharged for about 1 hour with a constant current of 1 C until the battery voltage was 2.5 V (fourth cycle).

Thereafter, the battery was charged for about 3 hours with a constant current of 0.33 C until the battery voltage was 4.25 V. Subsequently, the battery was discharged for about 3 hours with a constant current of 0.33 C until the battery voltage was 2.5 V (fifth cycle).

These cycles were performed a total of 60 times to evaluate the capacity change and capacity retention rate of the battery according to the number of cycles, respectively.

The high-rate characteristics are calculated according to Equation 1 below, and the capacity retention rate (lifetime) characteristics are evaluated according to Equation 2 below. In addition, the initial charge-discharge efficiency is evaluated by Equation 3.

High rate characteristics (%)=(discharge capacity at 0.33 C)/(discharge capacity at 0.1 C)×100   <Equation 1>

Capacity retention rate (%)=(discharge capacity after 5 cycles/discharge capacity of 1st cycle)×100   <Equation 2<

Initial charge-discharge efficiency (%)=(discharge capacity after 1 cycle/discharge capacity of 1st cycle)×100   <Equation 3>

Figure 6:
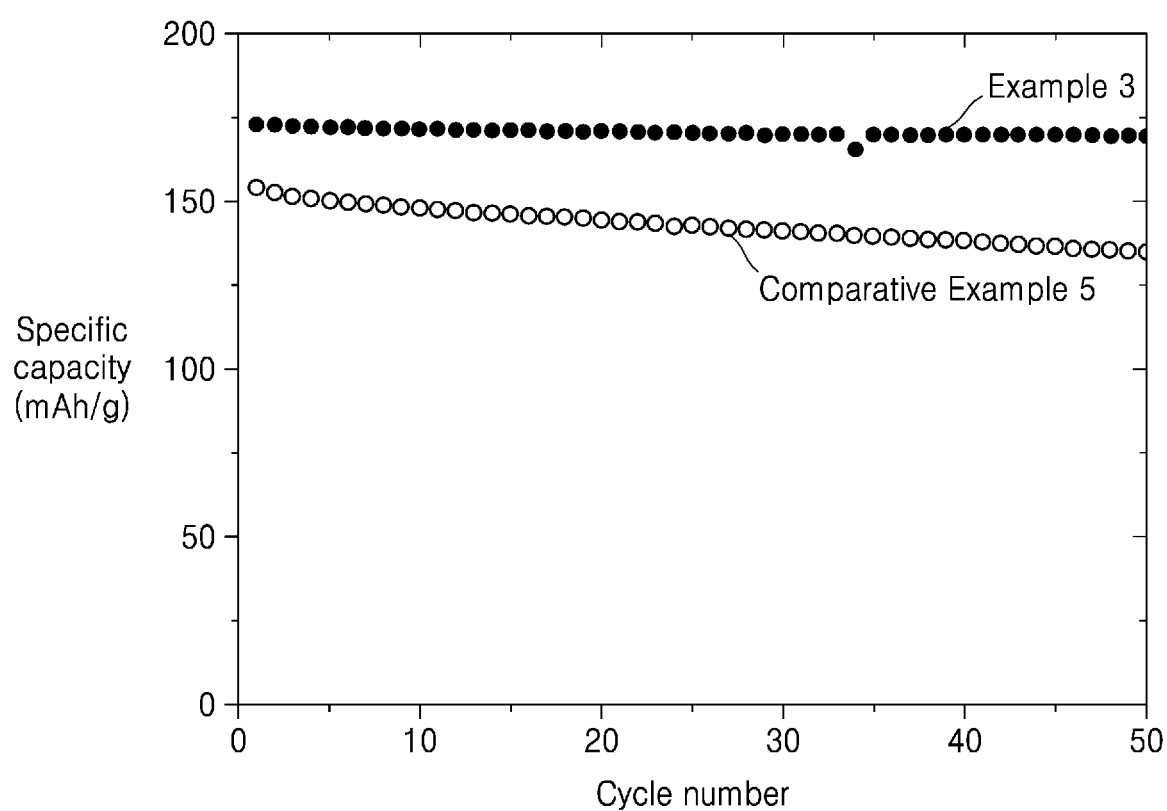
FIG. 6 is a graph showing a change in capacity retention rate of all-solid secondary batteries manufactured according to Example 3 and Comparative Example 5.

Some of the capacity retention rate characteristics are shown in FIG. 6. FIG. 6 is a graph showing a change in capacity retention rate of all-solid secondary batteries manufactured according to Example 3 and Comparative Example 5.

Further, it was evaluated whether a short circuit occurred during the charging and discharging process, and the results thereof are shown in Table 3 below. When a short circuit occurred, it was indicated as "short". ". In Table 3 below, the symbol "X" means that a short circuit did not occur even after 60 cycles, and the symbol "O" means that a short circuit occurred after 2-5 cycles.

TABLE 3

| Class. | Short dining operation | Initial charge-discharge efficiency (%) | High-rate characteristics (%) (0.1 C/1.0 C) | Capacity retention rate (%) (@5 cycle) |
|---|---|---|---|---|
| Example 1 | X | 90.3 | 81.3 | — |
| Example 2 | X | 89.4 | 81.4 | — |
| Example 3 | X | 89.5 | 83.1 | 99.6 |
| Example 4 | X | 89.5 | 83.1 | — |
| Comparative Example 1 | X | 90 | 75.5 | — |
| Comparative Example 2 | O | 89.5 | Short | — |
| Comparative Example 3 | X | 89.9 | 75.5 | — |
| Comparative Example 4 | O | 89.5 | 83.1 | 93.9 |
| Comparative Example 5 | O | 90.0 | 86.0 | 97.3 |

As shown in Table 3, in the all-solid secondary batteries of Examples 1 to 4, a short circuit did not occur even after repeatedly performing 60 cycles after manufacturing, and excellent high-rate characteristics and lifetime characteristics were exhibited.

In contrast, in the all-solid battery of Comparative Example 2, a short circuit occurred, and as a result, high-rate characteristics (0.1 C/1.0 C) were deteriorated. Meanwhile, in the all-solid secondary battery of Comparative Example 4 and the all-solid secondary battery of Comparative Example 5, a short circuit occurred after 5 cycles and 60 cycles, respectively.

Referring to Table 3, in the all-solid secondary battery of Comparative Example 5, the capacity retention rate thereof was excellent, but as described above, a short circuit occurred after 60 cycles, and as shown in FIG. 6, the capacity characteristics thereof were greatly deteriorated compared to the all-solid secondary battery of Example 3.

The anode layer for all-solid secondary batteries according to an embodiment may contain a metal-carbon composite having excellent tap density, so that electrode plate porosity may be low, and adhesive force to the current collector or the solid electrolyte layer may be improved, thereby reducing the occurrence of short circuits and enabling the mass production thereof. When such an anode layer is provided, it is possible to provide an all-solid secondary battery having improved charge-discharge capacity and high-rate characteristics.

By way of summation and review, some lithium-ion batteries use an electrolyte including a flammable organic solvent, and there is a possibility of overheating and fire when a short circuit occurs. In this regard, all-solid batteries using a solid electrolyte instead of an electrolyte have been considered.

All-solid batteries do not use flammable organic solvents, and even when a short circuit occurs, the possibility of fire or explosion may be greatly reduced. Accordingly, the safety of such all-solid secondary batteries may be greatly increased as compared with that of other lithium-ion batteries.

An anode active material layer containing a metal and a carbon material may be used as an anode of an all-solid secondary battery. In such an anode active material layer, short circuits could occur, and may be addressed.

One or more embodiments may provide an anode layer for all-solid secondary batteries, the anode layer having improved adhesive force to a current collector or a solid electrolyte layer and having low porosity.

One or more embodiments may provide all-solid secondary battery including the above-described anode layer to have improved performance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. An anode layer for all-solid secondary batteries, the anode layer comprising:
   an anode current collector; and
   a first anode active material layer on the anode current collector,
   wherein the first anode active material layer includes a metal-carbon composite including a metal, carbon, and a polyol, and the metal includes silver, zinc, tin, or a combination thereof, and
   wherein, in the metal-carbon composite, a content of the metal is about 3 wt % to about 25 wt %, a content of the carbon is about 55 wt % to about 95 wt %, and a content of the polyol is about 2 wt % to about 40 wt %, based on a total weight of the metal-carbon composite.

2. The anode layer as claimed in claim 1, wherein the metal-carbon composite has:

a bulk density of about 0.1 g/cm$^3$ to about 0.5 g/cm$^3$, and a BET specific surface area of about 40 m$^2$/g to 60 m$^2$/g.

3. The anode layer as claimed in claim 1, wherein, in an infrared spectroscopic analysis of the metal-carbon composite, one absorption peak appears at a wave number of about 750 cm$^{-1}$ to about 1,200 cm$^{-1}$, and another absorption peak appears at a wave number of about 3,250 cm$^{-1}$ to about 3,500 cm$^{-1}$.

4. The anode layer as claimed in claim 1, wherein, in a thermogravimetric analysis of the metal-carbon composite, a weight loss is about 3 wt % to about 30 wt % at about 50° C. to about 150° C.

5. The anode layer as claimed in claim 1, wherein the anode layer has a porosity of 30% or less.

6. The anode layer as claimed in claim 1, wherein the polyol includes ethylene glycol, diethylene glycol, triethylene glycol, tetraethylene glycol, poly(ethylene glycol), propanediol, butanediol, pentanediol, hexanediol, glycerol, or a combination thereof.

7. The anode layer as claimed in claim 1, further comprising a metal or metalloid thin film between the anode current collector and the first anode active material layer.

8. The anode layer as claimed in claim 7, wherein:
the metal or metalloid thin film includes gold (Au), silver (Ag), magnesium (Mg), zinc (Zn), silicon (Si), tin (Sn), platinum (Pt), palladium (Pd), aluminum (Al), bismuth (Bi), or a combination thereof, and
the metal or metalloid thin film has a thickness of about 1 nm to about 800 nm.

9. The anode layer as claimed in claim 1, further comprising a second anode active material layer,
wherein:
the second anode active material layer includes a metal, a metalloid element, or a combination thereof, the metal or metalloid element being capable of forming an alloy with lithium, or
the second anode active material layer is a metal layer including lithium or a lithium alloy.

10. An all-solid secondary battery, comprising:
a cathode layer;
an anode layer; and
a solid electrolyte layer between the cathode layer and the anode layer,
wherein the anode layer is the anode layer as claimed in claim 1.

11. The all-solid secondary battery as claimed in claim 10, wherein:
the anode layer further includes a second anode active material on the first anode active material layer or between the anode current collector and the first anode active material layer, and
the second anode active material layer includes lithium or a lithium alloy.

12. The all-solid secondary battery as claimed in claim 10, wherein the anode layer further includes a carbon layer between the first anode active material layer and the solid electrolyte layer.

13. The all-solid secondary battery as claimed in claim 10, wherein a solid electrolyte included in the solid electrolyte layer is a sulfide solid electrolyte.

14. The all-solid secondary battery as claimed in claim 13, wherein the sulfide solid electrolyte includes $Li_2S$-$P_2S_5$, $Li_2S$-$P_2S_5$-LiX, in which X is a halogen element, $Li_2S$-$P_2S_5$-$Li_2O$, $Li_2S$-$P_2S_5$-$Li_2O$-LiI, $Li_2S$-$SiS_2$, $Li_2S$-$SiS_2$-LiI, $Li_2S$-$SiS_2$-LiBr, $Li_2S$-$SiS_2$-LiCl, $Li_2S$-$SiS_2$-$B_2S_3$-LiI, $Li_2S$-$SiS_2$-$P_2S_5$-LiI, $Li_2S$-$B_2S_3$, $Li_2S$-$P_2S_5$-$Z_mS_n$, in which m and n are each a positive number, and Z is Ge, Zn, or Ga, $Li_2S$-$GeS_2$, $Li_2S$-$SiS_2$-$Li_3PO_4$, $Li_2S$-$SiS_2$-$Li_pMO_q$, in which p and q are each a positive number, and M is P, Si, Ge, B, Al, Ga, or In, $Li_{7-x}PS_{6-x}Cl_x$, in which $0 \leq x \leq 2$, $Li_{7-x}PS_{6-x}Br_x$, in which $0 \leq x \leq 2$, or $Li_{7-x}PS_{6-x}I_x$, in which $0 \leq x \leq 2$.

15. The all-solid secondary battery as claimed in claim 13, wherein the sulfide solid electrolyte is an argyrodite solid electrolyte including $Li_6PS_5Cl$, $Li_6PS_5Br$, or $Li_6PS_5I$.

16. The anode layer as claimed in claim 1, wherein, in the metal-carbon composite, the metal includes silver.

17. A method of manufacturing an all-solid secondary battery, the method comprising:
providing an anode layer including an anode current collector and a first anode active material layer;
providing a cathode layer;
providing a solid electrolyte layer between the anode layer and the cathode layer to prepare a laminate; and
pressing the laminate,
wherein the first anode active material layer includes a metal-carbon composite including a metal, carbon, and a polyol, and the metal includes silver, zinc, tin, or a combination thereof, and
wherein, in the metal-carbon composite, a content of the metal is about 3 wt % to about 25 wt %, a content of the carbon is about 55 wt % to about 95 wt %, and a content of the polyol is about 2 wt % to about 40 wt %, based on a total weight of the metal-carbon composite.

18. The method as claimed in claim 17, wherein providing the anode layer includes applying a composition including the metal-carbon composite, a binder, and a solvent onto an anode current collector and drying to prepare the anode layer including the first anode active material layer including the anode current collector and a metal-carbon composite.

19. The method as claimed in claim 18, wherein the metal-carbon composite is prepared by:
mixing a carbon material, a metal precursor, a polyol, and a solvent to obtain a mixture; and applying light or heat to the mixture.

20. The method as claimed in claim 17, wherein, in the metal-carbon composite, the metal includes silver.

* * * * *